United States Patent [19]

Sato et al.

[11] E Patent Number: Re. 33,721

[45] Reissued Date of Patent: Oct. 22, 1991

[54] LIGHT BEAM SCANNING APPARATUS

[75] Inventors: Hideki Sato; Yoshinori Sugiura, both of Tokyo, Japan

[73] Assignee: Canon Kabushiki Kaisha, Tokyo, Japan

[21] Appl. No.: 246,274

[22] Filed: Sep. 19, 1988

Related U.S. Patent Documents

Reissue of:

[64] Patent No.: 4,623,216
Issued: Nov. 18, 1986
Appl. No.: 577,209
Filed: Feb. 6, 1984

[30] Foreign Application Priority Data

Feb. 10, 1983 [JP] Japan ..... 58-18625[U]
Feb. 10, 1983 [JP] Japan ..... 58-18626[U]

[51] Int. Cl.[5] ..... G02B 26/10

[52] U.S. Cl. ..... 359/198; 310/46; 359/217

[58] Field of Search ..... 350/6.8, 6.7, 6.6, 6.5; 310/46, 90, 109

[56] References Cited

U.S. PATENT DOCUMENTS

| | | | |
|---|---|---|---|
| 3,508,091 | 4/1970 | Kavanaugh . | |
| 4,217,508 | 8/1980 | Uzuka | 310/46 |
| 4,283,644 | 8/1981 | Kondo et al. . | |
| 4,346,946 | 8/1982 | Maruyama | 308/9 |
| 4,406,963 | 9/1983 | Wolf et al. | 310/90 |
| 4,438,542 | 1/1984 | Schuh | 360/97 |
| 4,443,043 | 4/1984 | Yamaguchi | 350/6.5 |
| 4,535,373 | 8/1985 | Schuh | 360/97 |
| 4,599,664 | 7/1986 | Schuh | 360/97 |

FOREIGN PATENT DOCUMENTS

| | | |
|---|---|---|
| 48-1282 | 1/1973 | Japan . |
| 50-11939 | 5/1975 | Japan . |
| 51-103208 | 9/1976 | Japan . |
| 52-30498 | 7/1977 | Japan . |
| 52-151807 | 12/1977 | Japan . |
| 52-152727 | 12/1977 | Japan . |
| 53-145854 | 11/1978 | Japan . |
| 54-73651 | 6/1979 | Japan . |
| 55-23871 | 2/1980 | Japan . |
| 56-3513 | 1/1981 | Japan . |
| 56-28855 | 7/1981 | Japan . |
| 57-80176 | 5/1982 | Japan . |
| 57-89357 | 6/1982 | Japan . |
| 57-192742 | 12/1982 | Japan . |
| 57-201073 | 12/1982 | Japan . |
| 58-5518 | 1/1983 | Japan . |

*Primary Examiner*—Bruce Y. Arnold
*Assistant Examiner*—Loha Ben
*Attorney, Agent, or Firm*—Fitzpatrick, Cella, Harper & Scinto

[57] ABSTRACT

A light beam scanning apparatus has a rotatable polygonal mirror member for scanning a light beam [,] *and* a rotary shaft [, means for holding the rotary shaft and the rotatable polygonal mirror member] *that are held* integrally, [means] *a support* for rotatably supporting the rotary shaft, [drive means] *a driver* for rotating the rotary shaft, the [drive means] *drover* having a rotatable member having a magnet and made integral with the rotary shaft, and a coil member provided on the rotary shaft side with respect to the rotatable member so as to be opposed to the magnet, and [means] *a holder* for holding the coil member on the body of the apparatus.

48 Claims, 5 Drawing Sheets

LIGHT BEAM SCANNING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an apparatus for scanning a light beam such as a laser beam. The field to which the present invention is particularly suited is a recording apparatus such as a copying apparatus or a printer which uses a light beam to accomplish image formation.

2. Description of the Prior Art

There has heretofore been utilized a light beam scanning apparatus of [the] *a* construction as shown in FIG. 1 of the accompanying drawings wherein a rotatable polygonal mirror is fixedly held on a rotary shaft and deflects a light beam.

The construction of FIG. 1 will hereinafter be described briefly, In FIG. 1, reference numeral 1 designates a well-known rotatable polygonal mirror member having side surfaces as mirror surfaces, reference numeral 2 denotes a rotary shaft, and reference numeral 5 designates a rotating device (hereinafter referred to as the motor) as rotary shaft driving means.

In the construction of FIG. 1, the rotary shaft 2 is supported by bearing members 7 and 8 such as ball bearings provided in the immovable portions 17 and 18, respectively, of the casing 6 of the rotating device 5. The motor 5 has a stator 10 mounted on the inner wall of the casing 6 and having a stator coil 9, and a rotor magnet 11 mounted on the rotary shaft 2. By [a] power being supplied to the stator coil 9, the magnet 11 is rotated with the shaft 2, whereby the polygonal mirror member 1 is rotated and scans a light beam.

In FIG. 1, reference numeral 12 designates a compression spring positioned between an immovable portion 16 in the casing 6 and the bearing member 8. Reference numeral 13 denotes a rotation detecting disk mounted on the rotary shaft, reference numeral 14 designates a rotation detecting sensor, and reference numeral 15 denotes a set screw for fixing the rotatable polygonal mirror member to the rotary shaft.

The use of the light beam scanning apparatus of this type causes the image or the beam to be disturbed by a repeated use, and high-speed rotation of such apparatus also causes the image or the beam to be disturbed. The problem that, due to such disturbance, the image to be formed is not obtained or the beam is not properly scanned has been difficult to overcome. Such *a* difficult problem has several basic causes. The main ones of these causes are the surface fall of the polygonal mirror resulting from the difficulty encountered in adjustment of unbalance and the adherence of lubricant to the polygonal mirror which [occurs from] *is thrown off by* the bearing members. The surface fall is the irregularity of each mirror surface relative to a certain reference surface when a laser beam emitted from a predetermined position is scanned onto a light-receiving member such as a photosensitive medium by the reflection of the rotatable polygonal mirror. Specifically, as shown in FIG. 2 of the accompanying drawings, a beam emitted from a laser device is reflected by a mirror surface 1a of the rotatable polygonal mirror 1 and reaches a photosensitive medium 3, and in that case, if the mirror surface 1a causes great irregularity as indicated by 1b relative to the reference surface, the position of the beam 4 scanned onto the photosensitive medium 3 differs as indicated by 4b from mirror surface to mirror surface and therefore, the irregularity appears as pitch irregularity of the image or the image disappears.

In FIGS. 2a, 2b and 2c of the accompanying drawings, the deformation of the rotatable polygonal mirror 1 when *it is* mounted on the rotary shaft is indicated by *a* broken line.

To mount the well-known rotatable polygonal mirror member 1 having side surfaces as mirror surfaces onto the rotary shaft 2 operatively associated with a rotative driving device, there would occur to mind fixing devices as shown in FIGS. 2a, 2b and 2c. The fixing device shown in FIG. 2a is such that receiving member 19 having a receiving surface 19a orthogonal to the rotary shaft 2 is fixedly mounted on the rotary shaft 2 and the rotatable polygonal mirror member 1 is fixed to the receiving member 19 by means of three [to] *or* four screws 15a. In such a structure, deformation is caused between the vicinity of the portions of the rotatable polygonal mirror member which are fixed by the screws and the portions which are not fixed by the screws, and this in turn may cause the surface fall. The fixing device shown in FIG. 2b is such that to prevent the occurrence of the surface fall in the structure shown in FIG. 2a, rigid ring plates 20 are interposed between the heads of the fixing screws 15a and the rotatable polygonal mirror member 1, and again in this case, the surface fall similar to that in the case of FIG. 2a occurs more or less. Also, in the case of FIG. 2a, the irregularity of the fastening torques of the screws directly affects the surface fall. The fixing device shown in FIG. 2c is such that the boss portion 1b of the rotatable polygonal mirror member 1 is threaded and the polygonal mirror member is fixed to the rotary shaft 2 by a set screw 15, and again in this case, the surface fall occurs due to the backlash with respect to the rotary shaft 2. Also, where a form similar to that shown in FIG. 2c is adopted and the rotatable polygonal mirror member 1 is fixed to the rotary shaft 2 not by screws but by an adhesive agent, the same result occurs due to the irregularity or the like of the adhesive agent.

Where the rotatable polygonal mirror member is thus fixed by means of screws or the like, the unbalance during rotation becomes particularly great and therefore, adjustment of such unbalance becomes necessary. However, the unbalance is greatly varied simply by turning the screws several times and therefore, the adjustment of the unbalance is [highly] *very* difficult, and this leads to irregularity of products and increased manufacturing cost. In addition, the apparatus becomes bulky to achieve the stability of rotation and accordingly becomes heavy in weight.

Thus, compact, light-weight light beam scanning apparatuses have been desired and moreover, apparatuses which are high in scanning accuracy and capable of effecting beam scanning at high speeds have been desired eagerly from the viewpoint of enhanced recording speed as well.

In the construction of the rotating device as described above, a part of the bearing member 7 is exposed to the rotatable polygonal mirror member 1 side and oil mist 21 created from the lubricant in the bearing 7 with rotation scatters outwardly during rotation of the shaft, whereby the oil mist adheres to the mirror surfaces of the rotatable polygonal mirror member 1, and this has resulted in the reduced reflection factor of the polygonal mirror member. To prevent this, sealing such as magnetic seal or labyrinth is provided near the bearing member, but the effect thereof is not sufficient when viewed from the viewpoint of long-time use and in the apparatuses of the high-speed rotation type, accurate scanning of the beam is difficult and image vibration is liable to occur.

In the past, there has been no light beam scanning apparatus which can prevent the reduction in scanning accuracy resulting from such cause and moreover, there has been no light beam scanning apparatus which can be made compact.

SUMMARY OF THE INVENTION

The present invention chiefly intends to improve the aforedescribed beam scanning accuracy and rationally solve each or all of the above-noted problems.

It is a primary object of the present invention to provide a light beam scanning apparatus which maintains good scanning accuracy even if it scans a light beam at a high speed.

It is another object of the present invention to provide a compact light beam scanning apparatus which is capable of effecting high-speed scanning.

It is still another object of the present invention to provide a light beam scanning apparatus which permits the final adjustment during assemblage of parts to be simplified or almost eliminated.

It is yet still another object of the present invention to provide a light beam scanning apparatus in which the surface vibration and surface fall of the polygonal mirror and/or [stain] *contaminants* such as oil mist which will reduce the scanning accuracy can be prevented.

Other objects of the present invention will become apparent from the following detailed description taken in conjunction with the accompanying drawings.

DESCRIPTION OF THE PREFERRED EMBODIMENTS

Figure 2:
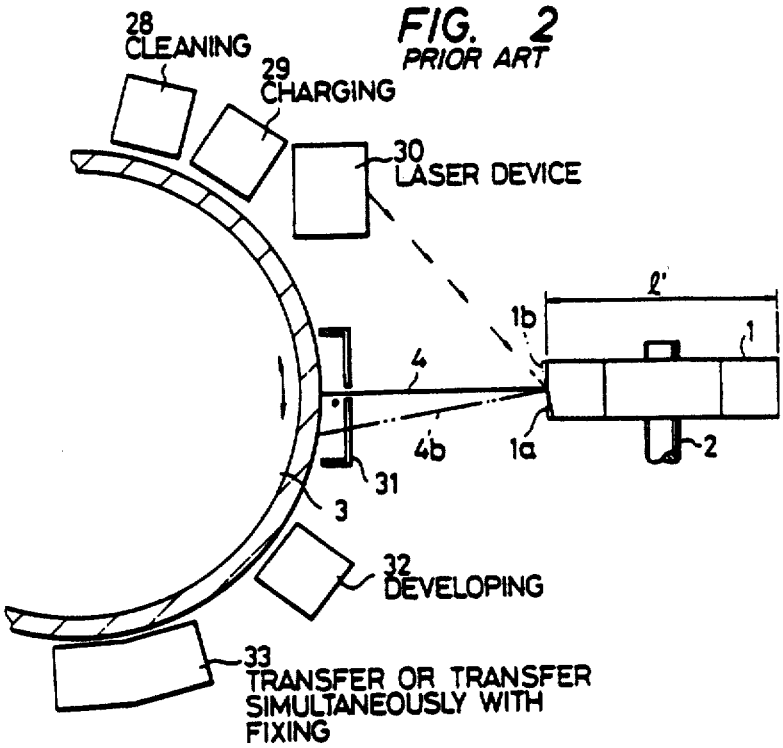
FIG. 2 PRIOR ART
FIG. 2 is a schematic illustration of a recording apparatus to which a light beam scanning apparatus is applied.
Figure 2A:
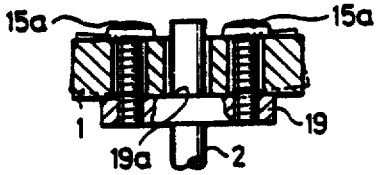
FIG. 2a PRIOR ART
FIGS. 2a, 2b and 2c illustrate the disadvantages peculiar to the conventional methods of mounting a rotatable polygonal mirror.
Figure 2B:
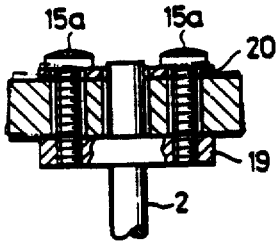
FIG. 2b PRIOR ART
Figure 2C:
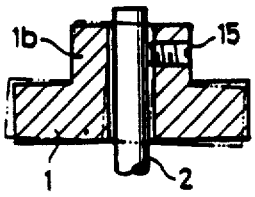
FIG. 2c PRIOR ART

Before embodiments of the present invention are described by reference to FIGS. 3 to 10, an example of the recording apparatus to which the present invention is applicable will be described briefly by reference to FIG. 2.

The aforedescribed rotatable polygonal mirror member 1 is fixed to the rotary shaft 2 by holding means to be described and is stably driven by drive means to be described. A light beam modulated by a signal to be recorded from a laser device 30 enters the rotatable polygonal mirror member 1. The light beam is scanned by rotation of the polygonal mirror and the scanned light beam enters a light-receiving member 3 such as a photosensitive medium and records a desired image.

A uniformly charged surface is preformed on the light-receiving member 3 such as a photosensitive medium by conventional cleaning means 28 and charging means 29 acting thereon. Thereafter, as the light-receiving member 3 is rotated, the light beam 4 is applied thereto and simultaneously therewith, secondary charging means 31 acts to form a latent image, whereafter the latent image is developed into a visible image by developing means 32. The visible image is transferred to a recording medium such as paper by means 33 for transfer or transfer simultaneously with fixing.

Figure 1:
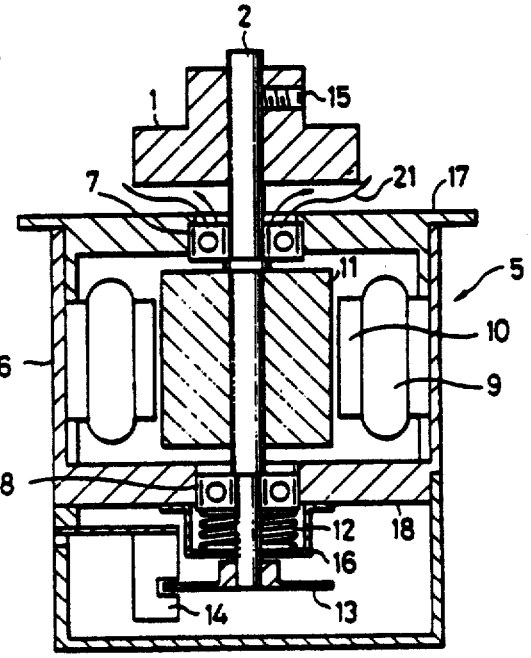
FIG. 1 PRIOR ART
FIG. 1 is a schematic illustration of a light beam scanning apparatus according to the prior art.
Figure 3:
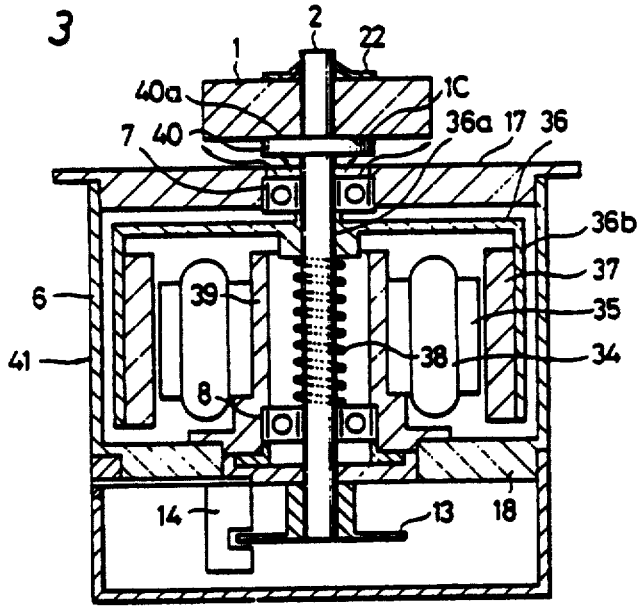
FIG. 3 illustrates an embodiment of the present invention.

Now, a feature of the construction for stabilizing the light beam 4 is that, as shown in FIG. 3, outer-rotor-type drive means 41 is applied to the rotatable polygonal mirror member 1. As can be seen in [FIG. 2] *FIG. 1* is compared with FIG. 3, in FIG. 3, a coil member having a stator 35 as an immovable portion and a stator coil 34 is provided near the rotary shaft 2, and an outer rotor 36 as a rotatable member made integral with a magnet 37 as a movable portion is made integral with the rotary shaft by a coupling portion 36a, the magnet 37 being disposed in opposed relationship with the stator coil 34. If the outer-rotor-type drive means 41 is thus used, the height of the body of the light beam scanning apparatus can be decreased and in addition, rotation of the rotatable polygonal mirror 1 can be stabilized, because the outer rotor 36 creates a great moment of inertia. Thus, the surface vibration of the rotatable polygonal mirror member 1 can be prevented considerably.

The construction of FIG. 3 will be described in more detail and the embodiment of FIG. 4 will also be described.

The rotary shaft 2 is two-point-supported by a bearing member 7 provided in the immovable portion 17 of the drive means 41 and positioned between the rotor 36 and the rotatable polygonal mirror member 1 and a bearing member 8 positioned within the rotor 36 and fixed to an inner cylinder 39 which in turn is fixed to the center of a casing 6. The stator 35 provided with the stator coil 34 is mounted on the outer wall of the inner cylinder 39, and the rotor magnet 37 is mounted on the inner wall of the outer cylinder 36b of the rotor 36 which is concentric with the inner cylinder 39, the upper wall of the rotor being secured to the rotary shaft 2 by means of a coupling portion 36a. By the coil 34 being supplied with a power from power supply means, not shown, the rotor 36 is rotated with the shaft 2, whereby the polygonal mirror member 1 is also rotated with the shaft 2 to thereby scan the light beam. Designated by 38 is a compression spring positioned between the bearing member 8 and the coupling portion 36a of the outer rotor 36 to control the up and down movement of the outer rotor. Reference numeral 13 designates a rotation detecting disk attached to the lower end of the rotary shaft, and reference numeral 14 denotes a rotation detecting sensor which controls the rotation of the polygonal mirror member by rotation control means, not shown.

Figure 4:
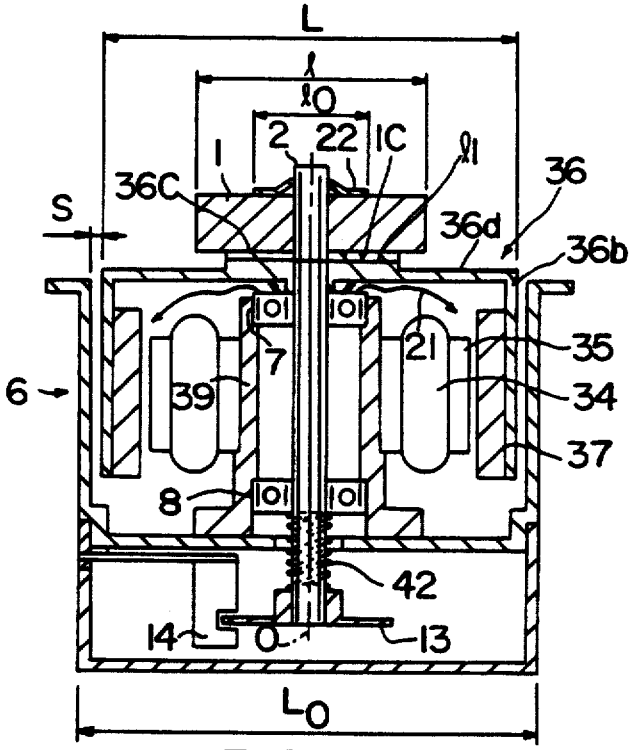
FIG. 4 illustrates another embodiment of the present invention.

FIG. 4 shows an embodiment substantially similar to that shown in FIG. 3. In FIG. 3 the rotor 36 holding the rotor magnet 37 is surrounded by the casing 6 of the drive device and the upper bearing member 7 is exposed on the rotatable polygonal mirror member side and therefore, oil mist [of] *created from* the lubricating oil within the bearing member 7 may scatter toward the rotatable polygonal mirror member as indicated by arrows during rotation of the shaft 2 to [stain] *adhere to* the polygonal mirror member and reduce the reflection factor thereof, thereby causing a reduced scanning characteristic such as density irregularity of image. In contrast, in the embodiment shown in FIG. 4, the rotor 36 holding the rotor magnet 37 is secured to and made integral with the rotary shaft 2 so as to position the bearing member 7 on the side opposite to the rotatable polygonal mirror member 1 and both of the bearing members 7 and 8 are covered by the rotor 36 and therefore, oil mist created from within the bearing member 7 only scatters in the lower portion of the device than the rotor 36 as a rotatable member, as indicated by arrows. Accordingly, the oil mist does not scatter toward the rotatable polygonal mirror member 1 to stain the mirror surfaces thereof because the bearing members 7 and 8 supplied with lubricant and the rotatable polygonal mirror member are substantially shielded from each other by the rotor 36.

Also, in FIG. 3, a receiving member 40 having a receiving surface 40a orthogonal to the rotary shaft 2 is fixedly mounted on the shaft 2, and the mounting reference surface 1c of the rotatable polygonal mirror member 1 fitted onto the rotary shaft is caused to bear against the circular receiving surface 40a of the receiving member 40. Moreover, in the central inner diametral portion near the shaft, the central portion of the polygonal mirror member 1 is resiliently pressed by a resilient member 22 as pressing means restrained by the rotary shaft 2, and the rotatable polygonal mirror member 1 is held between the resilient member 22 and the receiving member 40, whereby the rotatable polygonal mirror member 1 is fixed on the rotary shaft 2. That is, the polygonal mirror member 1 is integrally and fixedly held to both of the receiving member 40 and the shaft 2 by the friction force between the polygonal mirror member and the receiving surface 40a of the receiving member 40. By the member 1 being thus fixed to the rotary shaft in such a manner that it is held between the resilient member and the positioning member, no unreasonable force is applied to the polygonal mirror member 1, nor any mounting backlash is created and therefore, the aforementioned surface fall does not occur and thus, good image recording and stable beam scanning become possible.

In FIG. 4, the receiving surface as the positioning surface of the positioning member is provided on the end wall of the rotor 36 holding the rotor magnet 37 so that the rotor 36 itself serves also as the receiving member. That is, a receiving surface 36c orthogonal to the rotary shaft 2 is formed on the inner end surface of the rotor 36 which faces the rotary shaft, and the mounting reference surface 1c of the rotatable polygonal mirror member 1 is caused to bear against the receiving surface 36c and moreover, the rotatable polygonal mirror member 1 is held between a resilient member 22 similar to that shown in FIG. 3 and the rotor 36, whereby the rotatable polygonal mirror member 1 is fixedly held on the rotary shaft 2. Thus, the center of gravity of the rotatable body including the rotatable member and the polygonal mirror member becomes further lower and therefore, the stability of rotation can be further improved and further compactness of the apparatus can be achieved.

Also, in FIGS. 3 and 4, the radius of each member with the center 0 of the rotary shaft 2 as the reference is set in a predetermined relationship for stabilizing the rotation of the rotatable polygonal mirror member 1.

First is the relationship between the outer rotor 36 and the rotatable polygonal mirror member 1. In the above-described apparatus, the outer rotor 36 has its cross-section with respect to the direction of the rotary shaft formed substantially in an inverted U-shape, that is, formed by an outer cylinder 36b forming a cylindrical portion and the upper lid 36d of this outer cylinder 36b. In the outer rotor 36 of such shape, the radius of gyration thereof is one half of the outside diameter L of the outer cylinder 36b and if the radius of gyration of the rotatable polygonal mirror member 1 is one half of the outside diameter 1 thereof, there is the relation that $L/2 > \frac{1}{2}$, that is $L > 1$. This leads to the effect of endowing not the polygonal mirror member 1 but the other rotatable member 36 with a great moment of inertia and alleviating the degree of unbalance created in the polygonal mirror member 1 and the holding means therefor.

The radius of gyration of the rotatable polygonal mirror member 1 may also be one half of the distance 1′ from a mirror to the mirror opposed thereto.

Second is the relationship of size between the rotatable polygonal mirror member 1 and the positioning surface. The mounting reference surface 1c of the member 1 is subjected to surface working of considerably high accuracy, but there occurs a surface fall even if it is accurately held by the holding means, and this has sometimes led to reduced beam scanning accuracy. As a result of a detailed study, it has been found that making the positioning surface larger than the mounting reference surface of the polygonal mirror member to increase the stability rather creates great irregularity of each product under the influence of the mirror edge portion. That is, it has often been experienced that the edge portion of the polygonal mirror member 1 which is frequently handled is deformed by striking against another part for some reason or other and after all, it cannot be stably mounted on the positioning surface.

To solve such a problem, only the vicinity of the center of rotation of the polygonal mirror member 1 is made into the mounting reference surface corresponding to the positioning surface. That is, the positioning surface is provided on that side of the rotary shaft which is inside the radius of gyration $\frac{1}{2}$ (preferably $\frac{1}{2}'$) of the polygonal mirror member 1. The radius $1\frac{1}{2}$ when the positioning surface is made into a circular flat surface surrounding the rotary shaft 2 should suitably be smaller than $\frac{1}{2}$ (or $\frac{1}{2}'$). It is important for improving the stability that the positioning surface is a flat surface surrounding the rotary shaft 2.

Third is the relationship between the resilient member 22 as the pressing member and the positioning surface. The inventors have confirmed that the great factor for preventing the surface vibration and surface fall of the rotatable polygonal mirror member lies in the member provided around the polygonal mirror member. That is, as the outside diameter of the member which is in direct contact with or imparts as extraneous pressure to the rotatable polygonal mirror member is smaller than the outside diameter of the polygonal mirror member itself and such member is more concentrated at the central portion whereat the rotary shaft lies, the degree of influence upon rotation becomes smaller. However, it has also been confirmed that such member being concentrated simply at the central portion is not sufficient but the following condition must be satisfied.

That is, in the embodiments as shown in FIGS. 3, 4 and 7–10 wherein the polygonal mirror member is held between the positioning surface and the pressing member (not fastened by bolts), the acting surface by which the pressing member presses the polygonal mirror member should optimally be inside the positioning surface, *and* preferably be substantially coincident with the outside diameter of the positioning surface. If FIG. 4 is used, this may be shown by the fact that the outside diameter $l_1$ of the circular positioning surface and the outside diameter $l_0$ of the resilient member are in the relation that $l_1 > l_0$, preferably $l_1 \approx l_0$.

That is, it is preferable that the acting surface on which the pressing means acts and the surface which the positioning surface supports be in a mutually corresponding relationship (the acting surface ≧ the supporting surface) and be infinitely in the relationship that the acting surface = the supporting surface, the portion at the outside diameter thereof.

The above-described first, second and third relationships of magnitude individually achieve an excellent effect, and a combination of any two of these relationships leads to a more excellent result and a combination of all the three relationships exhibits even more excellent stability and can eliminate or simplify the adjustment of unbalance and can make the assemblage very easy.

The fixed state of the rotatable polygonal mirror member 1 of FIGS. 3 [or] *and* 4 will hereinafter be described in detail in the order of assemblage. First, the receiving member 40 (FIG. 3) or the rotor 36 (FIG. 4) is press-fitted to the rotary shaft 2. Subsequently, to provide the accuracy of the perpendicularity of the receiving surface 40a (or 36c) which receives the rotatable polygonal mirror member 1, secondary working of the receiving surface 40a is effected with the rotary shaft 2 as a guide. Then, the rotatable polygonal mirror member 1 is mounted so that the mounting reference surface 1c thereof and the receiving surface 40a (or 36c) face each other, whereafter the resilient member 22 is pushed in while being pressed from above it.

Figure 5:
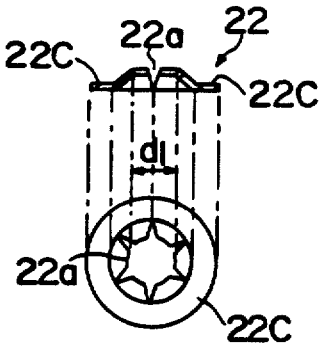
FIG. 5 illustrates the shape of a resilient member 22 shown in FIG. 4.
Figure 6:
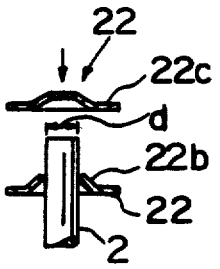
FIG. 6 illustrates the mounting of the resilient member 22 onto a rotary shaft 2.
Figure 7:
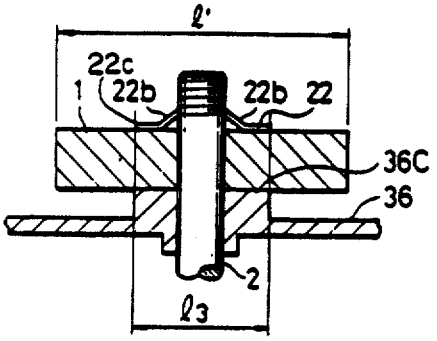
FIGS. 7 to 9 illustrate various embodiments of the holding means of the rotatable polygonal mirror member according to the present invention.

FIG. 5 shows a detailed enlarged view of the resilient member 22. As shown, the resilient member 22 comprises a disk-like resilient member (push nut) in which the diameter $d_1$ of the opening in the central inside diameter portion fitted to the rotary shaft before mounting is smaller than the diameter d of the rotary shaft and which has several splits 22a provided radially thereof and a flat disk surface portion 22c. This resilient member is pushed in from one end of the rotary shaft 2, as indicated by *an* arrow *in* FIG. 6. The diameter $d_1$ of the inner opening of the resilient member 22 is smaller than the diameter d of the rotary shaft 2, but since the several splits 22a are provided radially from the inside diameter portion of the resilient member, the resilient member may be mounted simply by applying a certain degree of pressure thereto due to the springy property of the portion 22b thereof which fits on the rotary shaft 2 when it is pushed in from above. After the rotatable polygonal mirror member 1 has been held down by the resilient member as shown in FIG. 7, the flat disk surface portion 22c presses the member 1 and the portion 22b eats into the rotary shaft 2, and a considerable thrust force is uniformly applied to the periphery of the rotary and 2 and in the circumferential direction of the rotatable polygonal mirror member 1, so that the rotatable polygonal mirror member 1 is secured without being deformed. In this case, the aforementioned thrust force is of course sufficient for the rotary shaft and the rotatable polygonal mirror member to be capable of rotating together.

In FIG. 7, the diameter 1′ of the polygonal mirror member 1 is much smaller than the diameter L of the outer rotor 36, and the outside diameter $l_3$ of the flat disk surface portion 22c of the resilient member 22 as the pressing means is made coincident with the outside diameter of the positioning surface 36c.

In the above-described embodiment, the resilient member is restrained on the rotary shaft at the inner end of the portion 22b thereof and the reference surface of the rotatable polygonal mirror member is urged against the receiving surface by the resiliency of the resilient member itself. In contrast, embodiments in which the restraining portion as the control means for the rotary shaft and the resilient member are made discrete from each other are shown in FIGS. 8 and 9.

Figure 8:
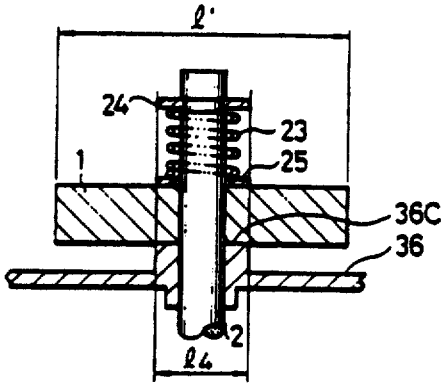

In the embodiment shown in FIG. 8, the resilient member comprises a compression spring 23, and a restraining member 24 (e.g., an E-ring or the like) for restraining the compression spring on the rotary shaft 2 at the center thereof is provided. The restraining member 24 acts as the upper limit control means of the spring 23 and applies the thrust force of the spring 23 to the rotatable polygonal mirror member 1. Thus, to impart a uniform thrust force to the rotatable polygonal mirror member, a keep ring 25 formed of a rigid material is provided so as to intervene between the compression spring 23 and the rotatable polygonal mirror member.

Figure 9:
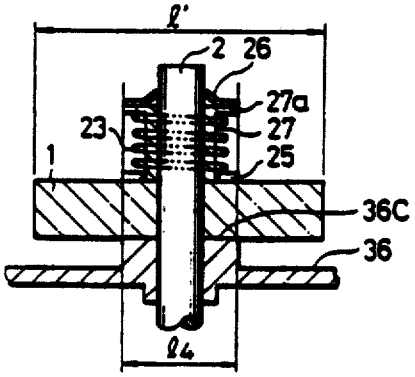

In the embodiment shown in FIG. 9, the resilient member 23 and keep ring 25 of FIG. 8 are likewise provided and instead of the restraining member 24 of FIG. 8, a disk-like resilient member (push nut) 26 as shown in FIG. 9 is used. In a case where the push nut alone is provided, a uniform pressure force is required during the mounting of the push nut in order that the rotatable polygonal mirror member and the push nut may be completely in intimate contact with each other, but in the case of FIG. 9, a positioning member 27 fitted to the rotary shaft is provided in contact with the rotatable polygonal mirror member 1. Even if the push nut is obliquely mounted, this mounting is effected through the projected restraining portion 27a of the positioning member 27, the resilient member 23 and the keep ring 25 and therefore, a uniform force is applied to the rotatable polygonal mirror member, which is thus secured without being deformed. In this case, one of various members, such as cylindrically shaped rubber and *a* wave washer, can be used as the resilient member. Also, working and adhesive fixing may of course be used with said means so as not to impart distortion to the polygonal mirror member.

As described above, the reference surface of the rotatable polygonal mirror member is caused to strike against the receiving surface of the receiving member whose accuracy (perpendicularity) relative to the rotary shaft is sufficiently guaranteed and the rotatable polygonal mirror member is held by the resilient member to which a thrust force is uniformly applied in the circumferential direction and therefore, deformation (surface fall) of the rotatable polygonal mirror member is prevented and control of the screw fastening torque is unnecessary in construction, and this leads to obtainment of the effect that the productivity during assemblage and manufacture is improved.

Further, in FIGS. 8 and 9, the area of the acting surface on which the pressing means 24, 23, 25 acts, i.e., the area in which the keep ring 25 bears against the rotatable polygonal mirror member 1 (or the area in which the keep ring 25 and the positioning member 27 bear against the member 1) is equal to the area of the positioning surface and the outside diameters are coincident with each other, i.e., $1_4$. As previously described, the embodiments of FIGS. 8 and 9 have the third relation of magnitude and therefore ensure more stable rotation.

Figure 10:
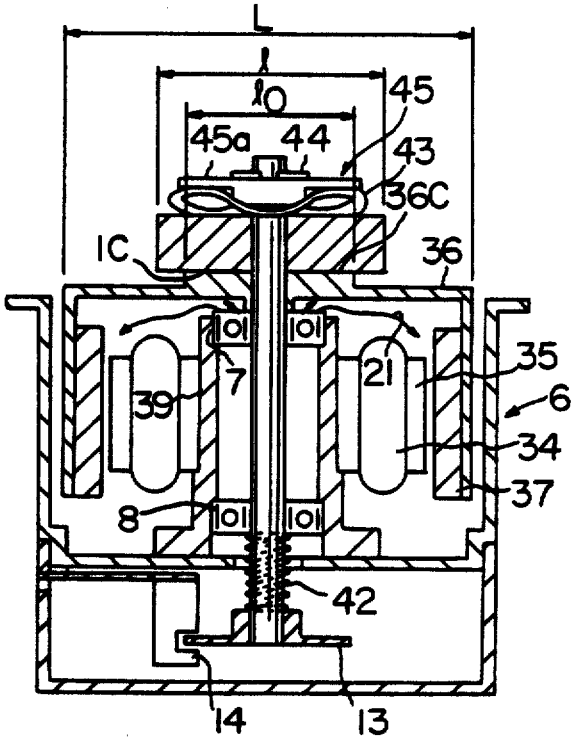
FIG. 10 illustrates still another embodiment of the present invention.

FIG. 10 shows an example of the apparatus which is particularly high in stability and degree of uniform pressurization and in which surface fall and surface vibration are prevented, and compactness, prevention of adherence of oil mist and ease of assemblage have all been realized. Basically, this apparatus is the same as the embodiment of FIG. 4 in the drive device 5 and in that it satisfies all of the first, second and third relationships of magnitude.

The structural difference between FIG. 4 and FIG. 10 resides in the pressing means for fixing the reference surface of the rotatable polygonal mirror member 1 into intimate contact with the positioning surface.

In FIG. 10, the pressing means provided at the center of rotation uses a wave washer 43 as the resilient member, and has a sleeve 45 provided with a restraining portion 45a projected to press the wave washer 43 and a C-ring 44 for controlling the upper limit movement thereof. The wave washer 43 is so positioned as to directly press the rotatable polygonal mirror member, and the sleeve 45 is slightly spaced apart from the rotatable polygonal mirror member by the resiliency of the wave washer 43 when its upper limit movement is controlled by the C-ring 44. However, the sleeve 45 may be brought into contact with the polygonal mirror member if the pressure of contact P between the sleeve 45 and the member 1 and the pressure of contact Q between the wave washer 43 and the member 1 satisfy the relationship that $P \leqq Q$.

The diameter of the acting surface by which the wave washer 43 resiliently presses the rotatable polygonal mirror member 1 is substantially coincident with the diameter of the positioning surface 36c. Thus, the distortion of the rotatable polygonal mirror member becomes minimum.

The effects of the sleeve 45 are: (1) it acts as the guide of the wave washer (resilient member) to eliminate eccentricity and prevent the occurrence of unbalance; and (2) it can determine the amount of contraction of the wave washer constantly and therefore can control the pressure force of the rotatable polygonal mirror member at a predetermined value and can prevent any excessive distortion.

It is practically preferable to determine the aforementioned first, second and third relations of magnitude and the weight of each member so as to satisfy the following condition:

$$2.5 \geqq \frac{2\omega\gamma w}{W \times 1000},$$

where $\omega$: rotational angular speed of the motor of the drive means (rad/sec.)

$\gamma$: radius in which unbalance exists (mm)

w: unbalance weight (g)

W: total weight of the rotating member (Kg).

Now, simply from the viewpoint of oil mist adherence prevention, as shown in FIGS. 4 and 10, use can be made of a method of securing the rotatable polygonal mirror member to the end wall of the rotor by means of set screws, a method of adhesively securing the rotatable polygonal mirror member to the end wall of the rotor or other suitable fixing method.

In the above-described constructions of FIGS. 3 and 10, the end wall of the rotor is securely fitted to the rotary shaft outside the bearing portion and therefore, the bearing is not exposed on the rotatable polygonal mirror member side. Accordingly, the oil mist 21 created in the bearing portion scatters toward the interior of the rotor 36, that is, does not go out of the bearing portion [to stain] *and adhere to* the mirror surfaces of the rotatable polygonal mirror member and thus, there is no possibility of reducing the reflection factor of the mirror surfaces. Also, it is not always necessary to provide a packing such as a labyrinth or a magnetic seal, and this leads to improved productivity during assemblage or manufacture.

The present invention is not restricted to the abovedescribed embodiments, but it covers all of embodiments based on the technique of the present invention, as well as any combinations of the abovedescribed embodiments.

What is claimed is:

1. A light beam scanning apparatus comprising:
a rotatable polygonal mirror member for scanning a light beam;
a rotary shaft;
means for holding said rotary shaft and said rotatable polygonal mirror member integrally;
means for rotatably supporting said rotary shaft;
drive means for rotating said rotary shaft, said drive means having a rotatable member having a magnet and made integral with said rotary shaft, and a coil member provided on the rotary shaft side with respect to said rotatable member so as to be opposed to said magnet; and
means for securing said coil member to the body of said apparatus.

2. A light beam scanning apparatus according to claim 1, wherein said rotatable member has said magnet concentric with said rotary shaft and the cross-section thereof with respect to the direction of said rotary shaft is substantially U-shaped.

3. A light beam scanning apparatus according to claim 1 or 2, wherein said holding means has a positioning member fixed to said rotary shaft above said rotatable member and moreover orthogonal to said rotary shaft and engaged with said rotatable polygonal mirror member, and a resilient member for pressing said rotatable polygonal mirror member against said positioning member and holding said rotatable polygonal mirror member between it and said positioning member, said resilient member being mounted on said rotary shaft.

4. A light beam scanning apparatus according to claim 3, wherein said supporting means has a first bearing for supporting said rotary shaft between said holding means and said rotatable member, and a second bearing for supporting said rotary shaft between said rotatable member and the lower portion of the body of said apparatus.

5. A light beam scanning apparatus according to claim 3, wherein the resilient member of said holding means has an engaging portion smaller than the outside diameter of said rotary shaft and resiliently deformable before it is mounted on said rotary shaft and engageable with said rotary shaft after it is mounted on said rotary shaft, and a pressing portion for pressing said rotatable polygonal mirror member.

6. A light beam scanning apparatus according to claim 3, wherein the resilient member of said holding means has a compression spring member and a control member for controlling the movement of said compression spring member in a direction away from said rotatable polygonal mirror member.

7. A light beam scanning apparatus according to claim 3, wherein said holding means has a positioning member for pressing having a cylindrical portion fitted to said rotary shaft and a restraining portion projected outwardly from said cylindrical portion, said resilient member positioned between said rotatable polygonal mirror member and said restraining portion of said positioning member, and a second resilient member for pressing said restraining portion of said positioning member toward said rotatable polygonal mirror member.

8. A light beam scanning apparatus according to claim 4, further having a compression resilient member wound on said rotary shaft and disposed between said rotatable member and said second bearing.

9. A light beam scanning apparatus according to claim 7, wherein said holding means has a keep ring between said second resilient member and said rotatable polygonal mirror member.

10. A light beam scanning apparatus comprising;

a rotatable polygonal mirror member for scanning a light beam;

a rotary shaft;

means for holding said rotary shaft and said rotatable polygonal mirror member integrally;

drive means for rotating said rotary shaft, said drive means having a rotatable member having a magnet and made integral with said rotary shaft, and a coil member provided on the rotary shaft side with respect to said rotatable member so as to be opposed to said magnet;

means for securing said coil member to the body of said apparatus; and first and second bearing means for rotatably supporting said rotary shaft on the side opposite to said rotatable polygonal mirror member with respect to said rotatable member.

11. A light beam scanning apparatus according to claim 10, wherein said rotatable member has said magnet concentric with said rotary shaft and the cross-section thereof with respect to the direction of said rotary shaft is substantially inverted U-shaped, and said rotatable polygonal mirror member is shielded from the magnet of said rotatable member, said coil member and said first and second bearing means by said rotatable member.

12. A light beam scanning apparatus according to claim 11, wherein said holding means has a positioning surface made integral with said rotary shaft and said rotatable member, and a member for pressing said rotatable polygonal mirror member toward said positioning surface.

13. A light beam scanning apparatus according to claim 11 or 12, further having a side wall surface provided through a small gap relative to the supporting surface along the rotary shaft of the rotatable member holding said magnet.

14. A light beam scanning apparatus according to claim 13, wherein said rotatable member has a radius of gyration greater than the radius of gyration of said rotatable polygonal mirror member.

15. A light beam scanning apparatus according to claim 14, having, in succession from the upper portion thereof with respect to the direction of said rotary shaft, said pressing member, said rotatable polygonal mirror member, said positioning surface, said rotatable member and said first and second bearing means.

16. A light beam scanning apparatus according to claim 15, having, in the central portion thereof with respect to the radial direction from said rotary shaft, said first and second bearing means, said coil member, said magnet, the supporting surface of said rotatable member and said side wall surface.

17. A light beam scanning apparatus comprising:

a rotatable polygonal mirror member for scanning a light beam;

a rotary shaft;

means for holding said rotary shaft and said rotatable polygonal mirror member integrally;

support means provided with first and second bearings for rotatably supporting said rotary shaft, said polygonal mirror member, said first bearing and said second bearing being arranged on said rotary shaft in the named order;

drive means for rotating said rotary shaft, said drive means having a rotatable member having a magnet and made integral with said rotary shaft, and a coil member provided on the rotary shaft side with respect to said rotatable member so as to be opposed to said magnet, said rotatable member being lubricated with oil and being fixed to said rotary shaft at a position between the first bearing with lubricant of said support means and said rotatable polygonal mirror member to shield oil mist created from said first bearing relative to said rotatable polygonal mirror member; and means for holding said coil member on the body of said apparatus.

18. A light beam scanning apparatus according to any one of claims 1, 2, 10, 11 and 17, wherein said holding means has a circular positioning surface fixed to said rotary shaft to receive said rotatable polygonal mirror member and having a radius smaller than the radius of the lower surface of said rotatable polygonal mirror member.

19. A light beam scanning apparatus according to claim 18, wherein said holding means has on said circular positioning surface a resilient member for pressing said rotatable polygonal mirror member.

20. A light beam scanning apparatus according to claim 19, wherein said resilient member of said holding means is provided so as to surround said rotary shaft so that the pressing surface thereof is substantially coincident with said circular positioning surface.

21. A light beam scanning apparatus according to claim 19, wherein said holding means has a positioning member for pressing having a cylindrical portion fitted to said rotary shaft and a restraining portion projected outwardly from said cylindrical portion, said restraining portion being engaged with said resilient member.

22. A light beam scanning apparatus according to claim 21, wherein said holding means has a control member for controlling the movement of said positioning member relative to said rotatable polygonal mirror member.

23. A light beam scanning apparatus according to claim 22, wherein the acting portions of said resilient member, said positioning member and said control member, respectively, are positioned on the rotary shaft side within the size of said circular positioning surface.

24. A light beam scanning apparatus comprising:

a rotatable polygonal mirror member for scanning a light beam;

a rotary shaft;

means for holding said rotary shaft and said rotatable polygonal mirror member integrally;

means for rotatably supporting said rotary shaft; and drive means for rotating said rotary shaft, said drive means being provided with a rotatable member having a magnet and made integral with said rotary shaft, and a coil member provided on the rotary shaft side with respect to said rotatable member so as to be opposed to said magnet, the radius of gyration of said rotatable member being greater than the radius of gyration of said rotatable polygonal mirror member.

25. A light beam scanning apparatus according to claim 24, wherein said holding means has a positioning surface for holding said rotatable polygonal mirror member, said positioning surface being inside the radius of gyration of said rotatable polygonal mirror member and being smaller in area than said rotatable polygonal mirror member.

26. A light beam scanning apparatus according to claim 25, wherein said holding means has pressing means for pressing said rotatable polygonal mirror member toward said positioning surface.

27. A light beam scanning apparatus according to claim 26, wherein said pressing means is a resilient member.

28. A light beam scanning apparatus according to claim 27, wherein said resilient member of said holding means is provided so as to surround said rotary shaft so that the pressing surface thereof is substantially coincident with said positioning surface.

29. A light beam scanning apparatus according to claim 28, wherein said holding means has a positioning member for pressing having a cylindrical portion fitted to said rotary shaft and a restraining portion projected outwardly from said cylindrical portion, said restraining portion being engaged with said resilient member.

30. A light beam scanning apparatus according to claim 29, wherein said holding means has a control member for controlling the movement of said positioning member relative to said rotatable polygonal mirror member.

31. A light beam scanning apparatus according to claim 30, wherein the acting portions of said resilient member, said positioning member and said control member, respectively, are positioned on the rotary shaft side within the size of said positioning surface.

32. A light beam scanning apparatus according to claim 31, wherein said resilient member is a wave washer.

33. A light beam scanning apparatus according to any one of claims 24 to 32, wherein said supporting means has two bearings with lubricant for supporting said rotary shaft, said bearings being positioned on the side opposite to said rotatable polygonal mirror member with respect to said rotatable member.

34. A light beam scanning apparatus according to any one of claims 24 to 32, wherein said positioning surface is a surface made integral with said rotatable member.

35. A light beam scanning apparatus according to claim 33, wherein said positioning surface is a surface made integral with said rotatable member.

36. A light beam scanning apparatus according to claim 35, wherein said positioning surface is a circular surface made integral with said rotary shaft.

37. A light beam scanning apparatus according to claim 34, wherein said positioning surface is a circular surface made integral with said rotary shaft.

*38. A light beam scanning apparatus comprising:*

*a rotating member which is rotatable in one direction including a rotary shaft, a rotating mirror member for scanning a light beam, said rotating mirror member being disposed at a distal end of the rotary shaft, and a rotor member for rotating said rotating member, the rotor member being disposed adjacent to said rotating mirror member; and*

*bearing means for rotatably bearing said rotary shaft said bearing means being lubricated by oil and being provided at an opposite side to said rotating mirror member with respect to said rotor member.*

*39. A light beam scanning apparatus according to claim 38, wherein said rotor member has a larger radius of gyration than said rotating mirror member.*

*40. A light beam scanning apparatus according to claim 38, wherein said bearing means comprises first and second bearing members which are provided at an opposite side relative to said rotating mirror member with respect to said rotor member.*

*41. A light beam scanning apparatus according to claim 40, wherein said first and second bearing members each comprises a ball bearing.*

*42. A light beam scanning apparatus according to claim 38, wherein said rotor member further includes a reference plane for attaching thereto said rotating mirror member, said rotating mirror member being fixed to the reference plane by being resiliently pressed.*

*43. A light beam scanning apparatus according to claim 38, wherein said rotor member has a magnet.*

*44. A light beam scanning apparatus comprising:*

*a rotating member which is rotatable in one direction and includes a rotary shaft, a polygonal mirror member for scanning a light beam, and a rotor member for rotating the rotating member; and*

*the polygonal mirror member having a smaller radius of gyration than that of the rotor member.*

*45. A light beam scanning apparatus according to claim 44, wherein said rotor member has a surface for positioning said polygonal mirror member, to which surface said polygonal mirror member is pressed to be fixed.*

*46. A light beam scanning apparatus according to claim 44, wherein said rotor member is equi-diametrical disc-shaped.*

*47. A light beam scanning apparatus according to claim 44, wherein said rotor member comprises a magnet.*

*48. A light beam scanning apparatus according to claim 1, 10, 17, 24, 38, or 44, said apparatus being used for an exposure light source for effecting image-exposure to a movable light sensitive member of a laser beam printer.*

* * * * *

UNITED STATES PATENT AND TRADEMARK OFFICE

CERTIFICATE OF CORRECTION

PATENT NO. : Re. 33,721

DATED : October 22, 1991

INVENTOR(S) : Hideki Sato & Yoshinori Sugiura

It is certified that error appears in the above-identified patent and that said Letters Patent is hereby corrected as shown below:

On the title page:

IN [56], REFERENCES CITED:

Change the sixth cited reference, "4,438,542 1/1984 Schuh" to --4,438,542 3/1984 Schuh--.

IN THE ABSTRACT:

Line 7, change "drover" to --driver--.

Column 1, line 23, change "briefly," to --briefly.--

Column 4, line 26, change "in" to --if--.

Column 6, line 22, change "diameter l" to --diameter $\ell$--;

line 23, change "L/2 > ½, that is L > 1" to --L/2 > $\ell$/2, that is L > $\ell$--;

line 29, change "distance l'" to --distance $\ell'$--;

line 53, change "gyration ½ (preferably ½')" to --gyration $\ell$/2 (preferably $\ell'$/2);

line 54, change "radius 1½" to --radius $\ell_1$/2--; and line 57, change "½ (or ½')" to --$\ell$/2 (or $\ell'$/2)--.

UNITED STATES PATENT AND TRADEMARK OFFICE

CERTIFICATE OF CORRECTION

PATENT NO. : Re. 33,721

DATED : October 22, 1991

INVENTOR(S) : Hideki Sato & Yoshinori Sugiura

It is certified that error appears in the above-identified patent and that said Letters Patent is hereby corrected as shown below:

Column 7, line 17, change "diameter $1_1$" to --diameter $\ell_1$--;

line 18 change "diameter $1_0$" to --diameter $\ell_0$--;

line 19, change "$1_1 > 1_0$, preferably $1_1 \approx 1_0$." to --$\ell_1 > \ell_0$, preferably $\ell_1 \approx \ell_0$.--; and line 23, change "surface ≥ the" to --surface ≤ the--.

Column 8, line 11, change "diameter 1′" to --diameter $\ell'$--; and line 13, change "diameter $1_3$" to --diameter $\ell_3$--.

Column 9, line 13, change "i.e., $1_4$." to --i.e., $\ell_4$.--; and line 62, change "relations" to --relationships--.

Signed and Sealed this

Tenth Day of August, 1993

*Attest:*

*Attesting Officer*

Michael K. Kirk

MICHAEL K. KIRK

*Acting Commissioner of Patents and Trademarks*